(12) United States Patent
Taniguchi et al.

(10) Patent No.: US 12,319,291 B2
(45) Date of Patent: Jun. 3, 2025

(54) DRIVING ASSISTANCE METHOD AND DRIVING ASSISTANCE DEVICE FOR PERFORMING A LANE CHANGE

(71) Applicant: Nissan Motor Co., Ltd., Yokohama (JP)

(72) Inventors: Yohei Taniguchi, Kanagawa (JP); Shohei Nakamura, Kanagawa (JP); Kazuyuki Uwabo, Kanagawa (JP); Yuji Nagasawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/845,205

(22) PCT Filed: Mar. 18, 2022

(86) PCT No.: PCT/JP2022/012686
§ 371 (c)(1),
(2) Date: Sep. 9, 2024

(87) PCT Pub. No.: WO2023/175927
PCT Pub. Date: Sep. 21, 2023

(65) Prior Publication Data
US 2025/0100556 A1    Mar. 27, 2025

(51) Int. Cl.
*B60W 30/18*    (2012.01)
(52) U.S. Cl.
CPC ... *B60W 30/18163* (2013.01); *B60W 2552/10* (2020.02)

(58) Field of Classification Search
CPC ............... B60W 30/18163; B60W 2552/10
See application file for complete search history.

(56) References Cited

U.S. PATENT DOCUMENTS

| | | |
|---|---|---|
| 8,068,982 B2 | 11/2011 | Takada |
| 8,108,134 B2 | 1/2012 | Kageyama et al. |
| 8,700,305 B2 | 4/2014 | Hayakawa et al. |
| 11,136,037 B2 | 10/2021 | Saikyo et al. |
| 2008/0249710 A1 | 10/2008 | Takada |
| 2010/0138115 A1 | 6/2010 | Kageyama et al. |

(Continued)

FOREIGN PATENT DOCUMENTS

| | | |
|---|---|---|
| DE | 102015214573 A1 | 2/2017 |
| JP | 2008-256593 A | 10/2008 |

(Continued)

*Primary Examiner* — Daniel M. Robert
(74) *Attorney, Agent, or Firm* — Young Basile Hanlon & MacFarlane, P.C.

(57) ABSTRACT

A driving assistance method for performing a lane change of an own vehicle by an automated lane change function causes a controller to perform processing including: when a vehicle permitted to travel in, of a first lane and a second lane, the first lane is limited, the first lane and the second lane being a plurality of lanes on a road on which the own vehicle travels, the plurality of lanes being adjacent to each other and having a same travel direction, determining whether or not the own vehicle is traveling in the first lane in which a vehicle permitted to travel in the first lane is limited; and when determining that the own vehicle is traveling in the first lane, not performing a lane change from the first lane to the second lane by the automated lane change function.

6 Claims, 3 Drawing Sheets

(56) References Cited

U.S. PATENT DOCUMENTS

| | | | | |
|---|---|---|---|---|
| 2011/0166781 A1* | 7/2011 | Irie | ............... | G01C 21/3461 |
| | | | | 701/533 |
| 2012/0265431 A1 | 10/2012 | Hayakawa et al. | | |
| 2019/0263412 A1* | 8/2019 | Saikyo | ............ | B60W 30/18163 |
| 2022/0204047 A1* | 6/2022 | Mizoguchi | ........ | B60W 60/0059 |

FOREIGN PATENT DOCUMENTS

| | | |
|---|---|---|
| JP | 2010-128862 A | 6/2010 |
| JP | 2011-148483 A | 8/2011 |
| JP | 2019-144976 A | 8/2019 |

* cited by examiner

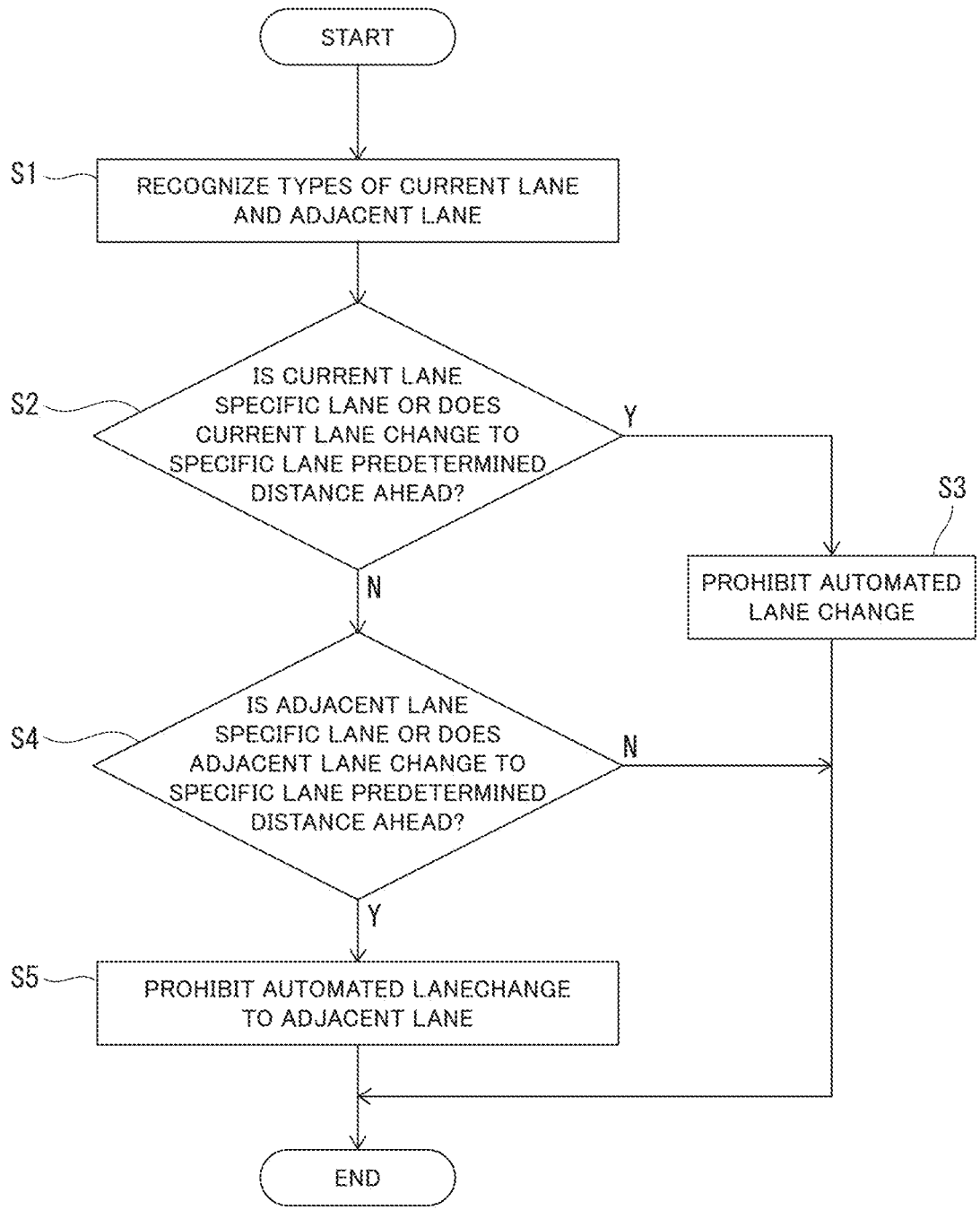

DRIVING ASSISTANCE METHOD AND DRIVING ASSISTANCE DEVICE FOR PERFORMING A LANE CHANGE

TECHNICAL FIELD

The present invention relates to a driving assistance method and a driving assistance device.

BACKGROUND

In JP 2019-144976 A described below, a vehicle control device that sets a determination condition to permit a lane change of an own vehicle from an own lane to an adjacent lane according to a type of the adjacent lane and, when the determination condition is satisfied, performs travel control or assistance control relating to the lane change is described.

SUMMARY

There are some cases where a vehicle that can travel in some lane among a plurality of lanes on the same road is limited by a rule. In the following description, a lane in which a vehicle that can travel in the lane is limited by a rule is sometimes referred to as a "specific lane", and a lane other than the specific lane is sometimes referred to as a "general lane".

When whether or not the own vehicle can travel in the specific lane cannot be determined even when the own vehicle has an automated lane change function, it is preferable not to perform automated lane change from the general lane to the specific lane. In this case, when the automated lane change from the specific lane to the general lane is performed, there is a risk that a passenger considers that the automated lane change function has no relation to the specific lane and misunderstands that the automated lane change from the general lane to the specific lane can be performed.

An object of the present invention is to provide an automated lane change function that complies with a rule limiting a vehicle that can travel in a specific lane and also facilitate recognition by a passenger that automated lane change to the specific lane is restricted.

According to an aspect of the present invention, there is provided a driving assistance method for performing a lane change of an own vehicle by an automated lane change function, the driving assistance method causing a controller to perform processing including: when a vehicle permitted to travel in, of a first lane and a second lane, the first lane is limited, the first lane and the second lane being a plurality of lanes on a road on which the own vehicle travels, the plurality of lanes being adjacent to each other and having a same travel direction, determining whether or not the own vehicle is traveling in the first lane in which a vehicle permitted to travel in the first lane is limited; and when determining that the own vehicle is traveling in the first lane, not performing a lane change from the first lane to the second lane by the automated lane change function.

According to an aspect of the present invention, it is possible to provide an automated lane change function that complies with a rule limiting a vehicle that can travel in a specific lane and also facilitate recognition by a passenger that automated lane change to the specific lane is restricted.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 4 is a flowchart of an example of a driving assistance method of the embodiment.

DETAILED DESCRIPTION

Configuration

Figure 1:
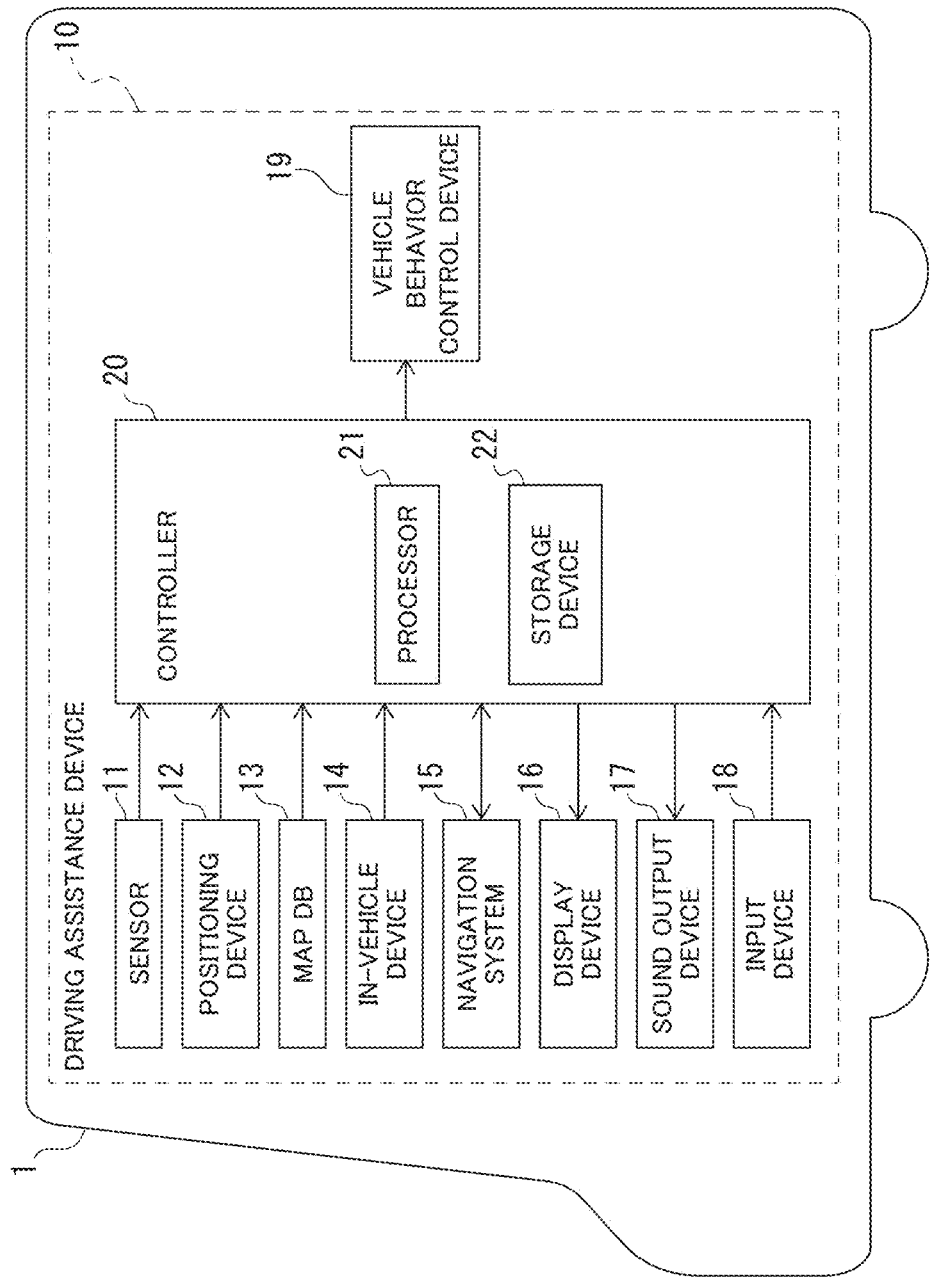
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on an own vehicle 1 includes sensors 11, a positioning device 12, a map database (map DB) 13, in-vehicle devices 14, a navigation system 15, display devices 16, sound output devices 17, input devices 18, a vehicle behavior control device 19, and a controller 20. The above-described devices are connected to one another via, for example, a controller area network (CAN) or another in-vehicle LAN in order to perform transmission and reception of information with one another.

The sensors 11 detect a travel state of the own vehicle 1. For example, the sensors 11 include cameras, such as a front view camera to capture a front view of the own vehicle 1, a rear view camera to capture a rear view of the own vehicle 1, and side view cameras to capture right and left side views of the own vehicle 1. In addition, the sensors 11 include radars, such as a front view radar to detect an obstacle in front of the own vehicle 1, a rear view radar to detect an obstacle in the rear of the own vehicle 1, and side view radars to detect an obstacle existing on the right and left lateral sides of the own vehicle 1. Further, the sensors 11 include a vehicle speed sensor or the like to detect vehicle speed of the own vehicle 1.

The positioning device 12 includes a GPS unit, a gyro sensor, a vehicle speed sensor, and the like. The positioning device 12 detects radio waves transmitted from a plurality of communication satellites by the GPS unit and periodically acquires position information of the own vehicle 1. In addition, the positioning device 12 detects a current position of the own vehicle 1, based on acquired position information of the own vehicle 1, angle change information acquired from the gyro sensor, and vehicle speed acquired from the vehicle speed sensor.

The map database 13 is a memory that stores three-dimensional high-definition map information including position information of various types of facilities and specific points and that is configured to be accessible from the controller 20. The three-dimensional high-definition map information is map information in which detailed and highly precise position information of a curved road and the amount of curvature (for example, curvature or radius of curvature) thereof, a junction of roads, a branch point, a tollgate, a point of reduction in the number of lanes, and the like is associated with the map information as three-dimensional information. In addition, the three-dimensional high-definition map information includes, as information in units of lanes (that is, lane information), information about lane nodes that indicate reference points on a lane reference line (for example, a center line in a lane) and information about lane links that indicate forms of lane sections between lane nodes.

In addition, the map database 13 may include lane type information relating to a type of a lane with respect to each lane. The lane type information may be information indicating, as a type of a lane, whether the lane is, for example, a specific lane in which a vehicle that can travel in the lane is limited by a traffic rule or a general lane that is a lane other than the specific lane. The specific lane may be, for example, a high occupancy vehicle (HOV) lane or a carpool lane that is provided on a freeway in the United States. The specific lane and the general lane are examples of a "first lane" and a "second lane" described in the claims, respectively.

The in-vehicle devices 14 are various types of devices mounted on the own vehicle 1 and operate in accordance with operation performed by a passenger (for example, a driver). Examples of such in-vehicle devices include a steering wheel, an accelerator pedal, a brake pedal, turn signals, windshield wipers, lights, a horn, other specific switches, and the like.

The navigation system 15 acquires current position information of the own vehicle 1 from the positioning device 12 and, by superimposing the position of the own vehicle 1 on map information for navigation, displays the current position on a display or the like. In addition, the navigation system 15 performs navigation control to, when a destination is set, set a route from the current position of the own vehicle 1 to the destination as a target travel route and guide the passenger along the target travel route. In the navigation control, the navigation system 15 displays the target travel route on a map on the display and informs the passenger of the target travel route by voice or the like. The target travel route set by the navigation system 15 is also used in route travel assistance control performed by the controller 20. The route travel assistance control is control to cause the own vehicle 1 to autonomously travel to the destination along the set target travel route.

The display devices 16 include a various types of displays, such as a display that the navigation system 15 includes, a display incorporated in a rearview mirror, a display incorporated in a meter section, and a head-up display projected on a windshield. The display devices 16 notify the passenger of various types of presented information in accordance with control performed by the controller 20.

The sound output devices 17 are devices to output acoustic information, such as a speaker that the navigation system 15 includes, a speaker of an audio device, and a buzzer. The sound output devices 17 notify the passenger of various types of presented information in accordance with control performed by the controller 20.

The input devices 18 are devices, such as a button switch that enables the passenger to input an operation by manual operation, a touch panel arranged on a display screen, and a microphone that enables the passenger to input an operation by voice. The passenger can input setting information in response to the presented information presented by a display device 16 or a sound output device 17 by operating an input device 18.

Figure 2:
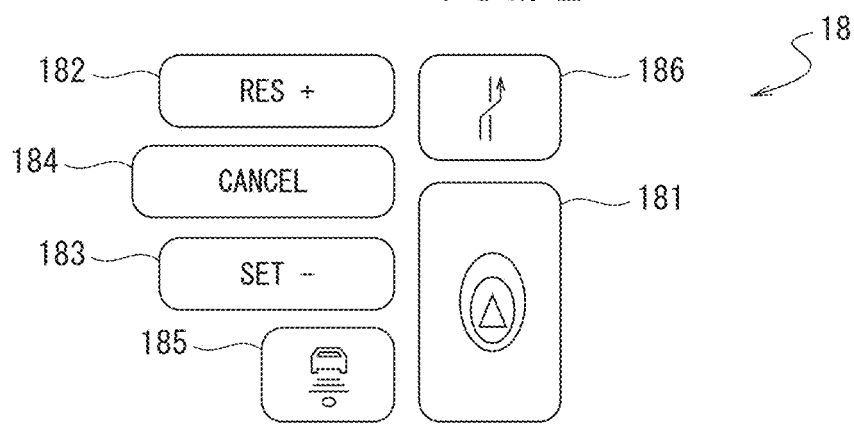
FIG. 2 is a diagram illustrative of some of input devices in FIG. 1.

FIG. 2 is a diagram illustrative of some of the input devices 18 of the present embodiment. The input devices 18 may be a button switch group that is arranged on, for example, a spoke of the steering wheel. The input devices 18 are used when turning-on and -off and the like of autonomous travel control performed by the controller 20 are set. The input devices 18 include a main switch 181, a resume/accelerate switch 182, a set/coast switch 183, a cancel switch 184, an inter-vehicle distance adjustment switch 185, and a lane change assistance switch 186.

The main switch 181 is a switch to turn on and off the autonomous travel control performed by the controller 20. The resume/accelerate switch 182 is a switch to, after the autonomous travel control is turned off, set resumption of the autonomous travel control at a set speed before the turning-off of the autonomous travel control or to increase the set speed. The set/coast switch 183 is a switch to start the autonomous travel control. In order to start the autonomous travel control, after the autonomous travel control is turned on by the main switch 181, the set/coast switch 183 is pressed. The set/coast switch 183 is also a switch to reduce the set speed. The cancel switch 184 is a switch to cancel the autonomous travel control. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (approve) the start of the lane change.

Note that, in addition to the button switch group illustrated in FIG. 2, a turn signal lever to turn on a turn signal and switches of other in-vehicle devices 14 can be used as the input devices 18.

The vehicle behavior control device 19 controls vehicle behavior of the own vehicle 1. For example, when the own vehicle 1 performs constant speed travel at a set speed by the autonomous travel control, the vehicle behavior control device 19 controls operation of a drive mechanism and brake operation to achieve acceleration/deceleration and travel speed that enable the own vehicle 1 to travel at the set speed. In addition, when the own vehicle 1 travels following a preceding vehicle by the autonomous travel control, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs lane-keeping control, lane change assistance control, passing assistance control, or route travel assistance control, which will be described later, by the autonomous travel control, the vehicle behavior control device 19 performs steering control of the own vehicle 1 by controlling operation of a steering actuator in addition to the operation control of the drive mechanism and the brake.

The controller 20 is one or a plurality of electronic control units (ECUs) for controlling travel of the own vehicle 1 and includes a processor 21 and peripheral components, such as a storage device 22. The processor 21 may be, for example, a CPU or an MPU. The storage device 22 may include a semiconductor storage device, a magnetic storage device, an optical storage device, or the like. The storage device 22 may include registers, a cache memory, and a memory, such as a ROM and a RAM, that is used as a main storage device.

Functions of the controller 20, which will be described below, are achieved by, for example, the processor 21 executing computer programs stored in the storage device 22.

The controller 20 achieves a travel information acquisition function to acquire information relating to a travel state of the own vehicle 1 and also performs autonomous travel control to autonomously control travel speed and/or steering of the own vehicle 1. The travel information acquisition function is a function to acquire travel information relating to a travel state of the own vehicle 1. For example, the controller 20 may acquire, as the travel information, image information of the outside of the vehicle captured by the front view camera, the rear view camera, and the side view cameras in the sensors 11. In addition, the controller 20 acquires, as the travel information, detection results by the front view radar, the rear view radar, and the side view radars. Further, the controller 20 also acquires, as the travel information, vehicle speed information of the own vehicle 1 detected by the vehicle speed sensor in the sensors 11.

Further, the controller 20 acquires, as the travel information, the current position information of the own vehicle 1 from the positioning device 12. The controller 20 acquires, as the travel information, a set destination and a target travel route to the destination from the navigation system 15. The controller 20 acquires, as the travel information, map information, such as position information of a curved road and the amount of curvature (for example, curvature or radius of curvature) thereof, a junction of roads, a branch point, a tollgate, a point of reduction in the number of lanes, and the like and lane information, from the map database 13. The controller 20 acquires, as the travel information, information about operation of the in-vehicle devices 14 performed by the passenger from the in-vehicle devices 14.

In the autonomous travel control, the controller 20 autonomously controls travel of the own vehicle 1 without depending on operation performed by the passenger. The autonomous travel control performed by the controller 20 includes autonomous speed control to autonomously control travel speed of the own vehicle 1 and autonomous steering control to autonomously control steering of the own vehicle 1.

Autonomous Speed Control

In the autonomous speed control, when the controller 20 is detecting a preceding vehicle, the controller 20 controls the own vehicle 1 to travel following the preceding vehicle while performing inter-vehicle distance control in such a way as to keep inter-vehicle distance depending on vehicle speed, with a vehicle speed set by the passenger or a speed limit as an upper limit. In contrast, when the controller 20 is not detecting a preceding vehicle, the controller 20 controls the own vehicle 1 to perform constant speed travel at the vehicle speed set by the passenger or the speed limit. The former and the latter are also referred to as inter-vehicle distance control and constant speed control, respectively. The passenger may set the inter-vehicle distance in the inter-vehicle distance control by operating the inter-vehicle distance adjustment switch 185.

The constant speed control is performed when it is detected by a front view radar or the like in the sensors 11 that no preceding vehicle exists ahead of the own vehicle 1 in a lane in which the own vehicle 1 is traveling. In the constant speed control, the controller 20 controls operation of the drive mechanism, such as the engine and the brake, by the vehicle behavior control device 19 while feeding back vehicle speed data detected by the vehicle speed sensor in such a manner that the own vehicle 1 maintains a set travel speed.

The inter-vehicle distance control is performed when it is detected by the front view radar or the like in the sensors 11 that a preceding vehicle exists ahead of the own vehicle 1 in the lane in which the own vehicle 1 is traveling. In the inter-vehicle distance control, the controller 20 controls operation of the drive mechanism, such as the engine and the brake, by the vehicle behavior control device 19 while feeding back inter-vehicle distance data detected by the front view radar in such a manner that the own vehicle 1 maintains a set inter-vehicle distance with the set travel speed as an upper limit.

Autonomous Steering Control

In the autonomous steering control, the controller 20 performs the steering control of the own vehicle 1 by controlling operation of the steering actuator, based on the travel information acquired by the travel information acquisition function. The autonomous steering control includes the lane-keeping control, the lane change assistance control, the passing assistance control, and the route travel assistance control.

In the lane-keeping control, the controller 20 assists steering wheel operation performed by the passenger by controlling the steering actuator in such a way that, for example, the own vehicle 1 travels substantially along the center of a lane.

In the lane change assistance control, when the passenger operates the turn signal lever, the controller 20 turns on a turn signal and determines whether or not a predetermined lane change start condition is established, based on various types of travel information acquired by the travel information acquisition function. The controller 20 starts the lane change operation when the lane change start condition is satisfied. The operation of the turn signal lever performed by the passenger in the lane change assistance control is an example of "instruction input of a lane change" described in the claims.

In the lane change operation, the controller 20 performs lane change manipulation to cause the own vehicle 1 to laterally move to an adjacent lane that is a lane change destination (hereinafter, sometimes referred to as "destination lane"). While the controller 20 is performing the lane change operation, the controller 20 presents information indicating that the own vehicle 1 is automatically making a lane change, to the passenger by a display device 16. When the lane change manipulation is finished, the controller 20 turns off the turn signal and starts performance of a lane-keeping function in the lane after lane change.

Hereinafter, a function of the controller 20 to perform the lane change assistance control is sometimes referred to as "lane change assistance function".

In the passing assistance control, when a preceding vehicle exists ahead of the own vehicle 1 in the lane in which the own vehicle 1 is traveling and a predetermined passing proposal condition is satisfied, the controller 20 proposes making a lane change by the autonomous travel control and passing the preceding vehicle, to the passenger. Hereinafter, a proposal to make a lane change to pass a preceding vehicle is sometimes referred to as "passing proposal".

When the passenger approves the passing proposal by operating the lane change assistance switch 186 in the input devices 18 in response to the presentation of the passing proposal and a predetermined passing proposal execution condition is satisfied, the controller 20 performs the automated lane change. In the automated lane change, the controller 20 performs the lane change operation in such a way that the own vehicle 1 moves to the destination lane.

Further, when after the own vehicle 1 has passed the preceding vehicle, a predetermined lane return proposal condition is satisfied, the controller 20 proposes making a lane change by the autonomous travel control and returning to an original lane before the passing of the preceding vehicle, to the passenger by a display device 16. Hereinafter, a proposal of a lane change to return to the original lane after passing a preceding vehicle is sometimes referred to as "lane return proposal". When the passenger approves the lane return proposal by operating the lane change assistance switch 186 in the input devices 18 in response to the presentation of the lane return proposal and a predetermined lane return execution condition is satisfied, the controller 20 performs the automated lane change. In the automated lane change, the controller 20 performs the lane change operation in such a way that the own vehicle 1 moves to the original lane. Hereinafter, a function of the controller 20 to perform the passing assistance control is sometimes referred to as "passing assistance function".

In the route travel assistance control, when a predetermined route travel execution condition is satisfied before the own vehicle 1 reaches a travel direction change point, such as a branch point, a junction, an exit, and a tollgate, that exists on the target travel route set by the navigation system 15, the controller 20 proposes making a lane change by the autonomous travel control to cause the vehicle to travel along the target travel route (that is, a lane change in accordance with navigation guiding the target travel route), to the passenger. Hereinafter, a proposal to make a lane change to cause the vehicle to travel along the target travel route is sometimes referred to as "route travel proposal". When the passenger approves the route travel proposal by operating the lane change assistance switch 186 in the input devices 18 in response to the presentation of the route travel proposal and the predetermined route travel execution condition is satisfied, the controller 20 performs the automated lane change. In the automated lane change, the controller 20 performs the lane change operation in such a way that the own vehicle 1 moves to the destination lane. Hereinafter, a function of the controller 20 to perform the route travel assistance control is sometimes referred to as "route travel assistance function".

The above-described assistance functions (the lane change assistance function, the passing assistance function, and the route travel assistance function) that cause the own vehicle 1 to make a lane change in an automated manner by the autonomous steering control are collectively referred to as "automated lane change functions".

As described above, some of a plurality of lanes that are provided on the same road and that have the same travel direction are sometimes specific lanes (lanes in each of which a vehicle that can travel in the lane is limited by a rule). Whether or not a lane in which the own vehicle 1 is traveling is a specific lane can be determined based on, for example, a measurement result of the current position of the own vehicle 1 measured by the positioning device 12 and the lane type information in the map database 13. Whether or not a lane in which the own vehicle 1 is traveling is a specific lane may also be determined by detecting a road mark indicating that the lane is a specific lane, using a camera in the sensors 11.

However, in some cases, a function to determine whether or not the own vehicle 1 satisfies a permission condition to permit a vehicle to travel in the specific lane is not installed in the own vehicle 1. For example, an HOV lane is a lane in which only a vehicle on which a predetermined number or more of passengers are on-board can travel, and to determine whether or not the own vehicle 1 can travel in the HOV lane, the own vehicle 1 is required to include a function to detect the number of passengers. In addition, even when the own vehicle 1 has a function to determine whether or not the own vehicle 1 satisfies the permission condition, the function cannot necessarily always make an appropriate determination.

When whether or not the own vehicle 1 can travel in the specific lane cannot be determined, it is preferable not to perform the automated lane change from the general lane to the specific lane. Thus, the controller 20 restricts the automated lane change from the general lane to the specific lane performed by the automated lane change function.

Specifically, the controller 20 does not perform the passing assistance function and the route travel assistance function when the destination lane is a specific lane. For example, the controller 20 prohibits the automated lane change from the general lane to the specific lane performed by the passing assistance function and the route travel assistance function.

Note, however, that when the passenger instructs lane change from the general lane to the specific lane by operating the turn signal lever, the controller 20 performs the automated lane change from the general lane to the specific lane by the lane change assistance function. This is because such a lane change is performed in accordance with an intention of the passenger and it is preferable to respect the intention of the passenger.

When in the case where the automated lane change from the general lane to the specific lane is restricted in this way, the automated lane change from the specific lane to the general lane is conversely performed, there is a risk that the passenger considers that the automated lane change function has no relation to the specific lane and misunderstands that the automated lane change from the general lane to the specific lane is also not restricted.

Therefore, when the own vehicle 1 is traveling in the specific lane, the controller 20 does not perform any of the automated lane change functions (in the present example, the lane change assistance function, the passing assistance function, and the route travel assistance function). Because of this configuration, recognition by the passenger that the automated lane change to the specific lane is restricted is facilitated.

Figure 3:
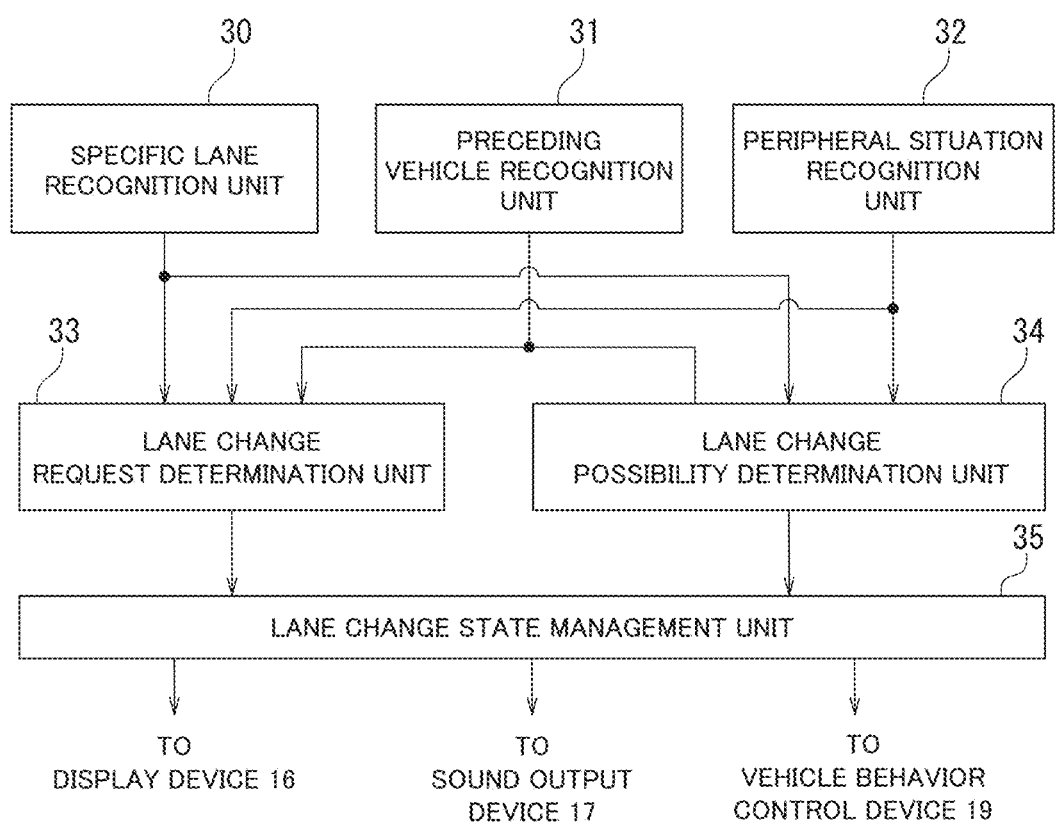
FIG. 3 is a block diagram of an example of a functional configuration of a controller.

FIG. 3 is a block diagram of an example of a functional configuration of the controller 20. The controller 20 includes a specific lane recognition unit 30, a preceding vehicle recognition unit 31, a peripheral situation recognition unit 32, a lane change request determination unit 33, a lane change possibility determination unit 34, and a lane change state management unit 35.

The specific lane recognition unit 30 determines whether or not a lane in which the own vehicle 1 is currently traveling (hereinafter, sometimes referred to as "current lane") is a specific lane and whether or not the current lane changes to a specific lane ahead in the course of the own vehicle 1, based on, for example, a measurement result of the current position of the own vehicle 1 measured by the positioning device 12 and the lane type information in the map database 13. Further, the specific lane recognition unit 30 determines whether or not an adjacent lane to the current lane is a specific lane and whether or not the adjacent lane changes to a specific lane ahead in the course of the own vehicle 1. The specific lane recognition unit 30 may make decisions described above by detecting a road mark indicating that a lane is a specific lane, using a camera in the sensors 11.

The preceding vehicle recognition unit 31 recognizes a preceding vehicle existing ahead of the own vehicle 1 in the lane in which the own vehicle 1 is traveling, based on the travel information and detects relative speed Vr (Vr=vehicle speed of the preceding vehicle-vehicle speed of the own vehicle) of the preceding vehicle with respect to the own vehicle 1.

The peripheral situation recognition unit 32 recognizes a situation in the surroundings of the own vehicle 1 (for example, other vehicles and white lines), based on the travel information. For example, the peripheral situation recognition unit 32 recognizes distance d in a lane extension direction between another vehicle in a destination lane and the own vehicle 1.

When the preceding vehicle recognition unit 31 recognizes a preceding vehicle, the lane change request determination unit 33 determines whether or not the predetermined passing proposal condition is satisfied. For example, the passing proposal condition may include the following conditions.

The passing assistance function is effective.

The relative speed Vr of the preceding vehicle with respect to the own vehicle 1 is less than a threshold speed Vt.

The distance d between another vehicle in the destination lane and the own vehicle 1 is greater than or equal to a distance threshold value Dp. For example, the distance d may be inter-vehicle distance or inter-vehicle time between the another vehicle and the own vehicle 1 in the lane extension direction.

Lane change to the destination lane side can be made (for example, a lane marking does not prohibit lane change, radius of curvature of the road is greater than or equal to 250 m, and the like).

The current lane is not a specific lane.

The destination lane is not a specific lane.

When the passing proposal condition is satisfied, the lane change request determination unit 33 outputs a passing proposal request to the lane change state management unit 35. That is, when the own vehicle 1 is traveling in the specific lane, the lane change request determination unit 33 does not output a passing proposal request. In addition, the lane change request determination unit 33 does not output a passing proposal request to make a lane change from the general lane to the specific lane.

When the passing assisted by the passing assistance control is finished, the lane change request determination unit 33 determines whether or not the predetermined lane return proposal condition is satisfied. For example, the lane return proposal condition may include the following conditions.

The passing assistance function is effective.

The distance d between another vehicle in the destination lane and the own vehicle 1 is greater than or equal to the distance threshold value Dp.

Lane change to the original lane side before the passing of the preceding vehicle can be made.

The current lane is not a specific lane.

The destination lane is not a specific lane.

When the lane return proposal condition is satisfied, the lane change request determination unit 33 outputs a lane return proposal request to the lane change state management unit 35. That is, when the own vehicle 1 is traveling in the specific lane, the lane change request determination unit 33 does not output a lane return proposal request. In addition, the lane change request determination unit 33 does not output a lane return proposal request to make a lane change from the general lane to the specific lane.

On the other hand, the lane change request determination unit 33 selects a lane in which the own vehicle 1 is currently required to travel (hereinafter, sometimes referred to as "target lane") in order to travel along the target travel route set by the navigation system 15 and determines whether or not a predetermined route travel proposal condition is satisfied. For example, the route travel proposal condition may include the following conditions.

The route travel assistance function is effective.

The lane in which the own vehicle 1 is currently traveling and the target lane are different from each other.

Distance dr from the current position of the own vehicle 1 to a travel direction change point is a distance da or less and a distance db or more. For example, the distance da may be 2300 m+400 m×N, and the distance db may be 700 m+400 m×N. The natural number N is the number of lane changes required for the own vehicle 1 to move from the lane in which the own vehicle 1 is currently traveling to the target lane.

Lane change to the target lane side can be made.

The current lane is not a specific lane.

The destination lane is not a specific lane.

When the route travel proposal condition is satisfied, the lane change request determination unit 33 sets a proposal point that is a point at which a route travel proposal is presented. When the own vehicle 1 reaches the proposal point, the lane change request determination unit 33 outputs a route travel proposal request to the lane change state management unit 35. That is, when the own vehicle 1 is traveling in the specific lane, the lane change request determination unit 33 does not output a route travel proposal request. In addition, the lane change request determination unit 33 does not output a route travel proposal request to make a lane change from the general lane to the specific lane.

When the lane change request determination unit 33 outputs a passing proposal request, the lane change state management unit 35 outputs passing information for presenting a passing proposal to the passenger, by a display device 16 or a sound output device 17. When the lane change request determination unit 33 outputs a lane return proposal request, the lane change state management unit 35 outputs lane return information for presenting a lane return proposal to the passenger, by a display device 16 or a sound output device 17. When the lane change request determination unit 33 outputs a route travel proposal request, the lane change state management unit 35 outputs route travel information for presenting a route travel proposal to the passenger, by a display device 16 or a sound output device 17. Therefore, when the own vehicle 1 is traveling in the specific lane, the lane change state management unit 35 does not present any of the passing proposal, the lane return proposal, and the route travel proposal to the passenger. In addition, the lane change state management unit 35 does not output any of the passing proposal, the lane return proposal, and the route travel proposal to make a lane change from the general lane to the specific lane.

When in response to the presentation of a passing proposal, the passenger approves the passing proposal by operating the lane change assistance switch 186 in the input devices 18, the lane change state management unit 35 turns on a turn signal. When the passing proposal is presented to the passenger, the lane change possibility determination unit 34 determines whether or not a predetermined passing execution condition is established. For example, the passing execution condition may include the following conditions.

The passing assistance function is effective.

The relative speed Vr of the preceding vehicle with respect to the own vehicle 1 is less than the threshold speed Vt.

The distance d in the lane extension direction between another vehicle in the destination lane and the own vehicle 1 is greater than or equal to the distance threshold value Dp.

Lane change to the destination lane side can be made.

The current lane is not a specific lane.

The destination lane is not a specific lane.

When the passenger approves the passing proposal and the passing execution condition is satisfied, the lane change state management unit 35 performs the automated lane change. In the automated lane change, the lane change state management unit 35 starts the lane change operation in such a way that the own vehicle 1 moves to the destination lane. Therefore, when the own vehicle 1 is traveling in the specific lane, the lane change state management unit 35 does not perform the automated lane change. In addition, the lane change state management unit 35 does not perform the automated lane change from the general lane to the specific lane.

When in response to the presentation of a lane return proposal, the passenger approves the lane return proposal by operating the lane change assistance switch 186 in the input devices 18, the lane change state management unit 35 turns on a turn signal. When the lane return proposal is presented to the passenger, the lane change possibility determination unit 34 determines whether or not the predetermined lane return execution condition is established. For example, the lane return execution condition may include the following conditions.

The passing assistance function is effective.

The distance d in the lane extension direction between another vehicle in the destination lane and the own vehicle 1 is greater than or equal to the distance threshold value Dp.

Lane change to the original lane side before the passing of the preceding vehicle can be made.

The current lane is not a specific lane.

The destination lane is not a specific lane.

When the passenger approves the lane return proposal and the lane return execution condition is satisfied, the lane change state management unit 35 performs the automated lane change. In the automated lane change, the lane change state management unit 35 starts the lane change operation in such a way that the own vehicle 1 moves to the destination lane. Therefore, when the own vehicle 1 is traveling in the specific lane, the lane change state management unit 35 does not perform the automated lane change. In addition, the lane change state management unit 35 does not perform the automated lane change from the general lane to the specific lane.

When in response to the presentation of a route travel proposal, the passenger approves the route travel proposal by operating the lane change assistance switch 186 in the input devices 18, the lane change state management unit 35 turns on a turn signal. When the route travel proposal is presented to the passenger, the lane change possibility determination unit 34 determines whether or not the predetermined route travel execution condition is established. For example, the route travel execution condition may include the following conditions.

The route travel assistance function is effective.

The lane in which the own vehicle 1 is currently traveling and the target lane are different from each other.

The distance dr from the current position of the own vehicle 1 to a travel direction change point is the distance da or less and the distance db or more.

The distance d in the lane extension direction between another vehicle in the destination lane and the own vehicle 1 is greater than or equal to the distance threshold value Dp.

Lane change to the target lane side can be made.

The current lane is not a specific lane.

The destination lane is not a specific lane.

When the passenger approves the route travel proposal and the route travel execution condition is satisfied, the lane change state management unit 35 performs the automated lane change. In the automated lane change, the lane change state management unit 35 starts the lane change operation in such a way that the own vehicle 1 moves to the destination lane. Therefore, when the own vehicle 1 is traveling in the specific lane, the lane change state management unit 35 does not perform the automated lane change. In addition, the lane change state management unit 35 does not perform the automated lane change from the general lane to the specific lane.

On the other hand, in the lane change assistance function, when the passenger operates the turn signal lever, the lane change state management unit 35 turns on a turn signal. The lane change possibility determination unit 34 determines whether or not the predetermined lane change start condition is established. Note that the lane change start condition may include, for example, the following conditions.

The lane change assistance function is effective.

The distance d between another vehicle in the destination lane and the own vehicle 1 is greater than or equal to the distance threshold value Dp.

Lane change to the destination lane side can be made.

The current lane is not a specific lane.

When the lane change start condition is satisfied, the lane change state management unit 35 performs the automated lane change. In the automated lane change, the lane change state management unit 35 starts the lane change operation in such a way that the own vehicle 1 moves to the destination lane.

Thus, the lane change state management unit 35 performs the automated lane change from the general lane to the specific lane by the lane change assistance function, as described above.

On the other hand, when the own vehicle 1 is traveling in the specific lane, the lane change state management unit 35 does not perform the automated lane change by the lane change assistance function.

Because of this configuration, when, for example, the own vehicle 1 attempts the automated lane change from the specific lane to the general lane, it is possible to prevent the own vehicle 1 from disturbing traffic flow in the specific lane. That is, since a vehicle that can travel in the specific lane is limited, the specific lane generally has lower traffic volume than the general lane and speed of a vehicle traveling in the specific lane is higher than speed of a vehicle traveling in the general lane. Thus, when the own vehicle 1 decelerates in the specific lane since it is difficult to make an automated lane change from the specific lane to the congested general lane, the own vehicle 1 sometimes obstructs following vehicles. By not performing the automated lane change when the own vehicle 1 is traveling in the specific lane, it is possible to prevent the own vehicle 1 from disturbing traffic flow in the specific lane in this way.

The vehicle behavior control device 19 performs steering control of the own vehicle 1 by controlling operation of the steering actuator, based on a command from the lane change state management unit 35.

Operation

FIG. 4 is a flowchart of an example of a driving assistance method of the embodiment.

In step S1, the controller 20 recognizes types of an adjacent lane to a current lane in which the own vehicle 1 is currently traveling and the current lane.

In step S2, the controller 20 determines whether or not the current lane is a specific lane or whether or not the current lane changes to a specific lane ahead in the course of the own vehicle 1. When the current lane is a specific lane or the current lane changes to a specific lane ahead in the course of the own vehicle 1 (step S2: Y), the process proceeds to step S3. When the current lane neither is a specific lane nor changes to a specific lane ahead in the course of the own vehicle 1 (step S2: N), the process proceeds to step S4.

In step S3, the controller 20 prohibits automated lane change performed by all the automated lane change functions (in the present example, the lane change assistance function, the passing assistance function, and the route travel assistance function) installed in the own vehicle 1. Subsequently, the process terminates.

In step S4, the controller 20 determines whether or not the adjacent lane is a specific lane or whether or not the adjacent lane changes to a specific lane ahead in the course of the own vehicle 1. When the adjacent lane is a specific lane or the adjacent lane changes to a specific lane ahead in the course of the own vehicle 1 (step S4: Y), the process proceeds to step S5. When the adjacent lane neither is a specific lane nor changes to a specific lane ahead in the course of the own vehicle 1 (step S4: N), the process terminates. In this case, the controller 20 does not prohibit any automated lane change of the lane change assistance function, the passing assistance function, and the route travel assistance function.

In step S5, the controller 20 prohibits the automated lane change to the adjacent lane performed by the passing assistance function and the automated lane change to the adjacent lane performed by the route travel assistance function. Subsequently, the process terminates.

Advantageous Effects of Embodiment (1) A controller 20 performs driving assistance control to perform a lane change of an own vehicle 1 by an automated lane change function. The controller 20 performs processing including: when a vehicle permitted to travel in, of a first lane and a second lane, the first lane is limited, the first lane and the second lane being a plurality of lanes on a road on which the own vehicle 1 travels, the plurality of lanes being adjacent to each other and having a same travel direction, determining whether or not the own vehicle 1 is traveling in the first lane in which a vehicle permitted to travel in the first lane is limited; and when determining that the own vehicle 1 is traveling in the first lane, not performing a lane change from the first lane to the second lane by the automated lane change function.

Because of this configuration, when the automated lane change function that complies with a rule limiting a vehicle that can travel in the first lane is provided, recognition by a passenger that automated lane change to the first lane is restricted is facilitated.

(2) The controller 20 may accept instruction input of a lane change from the passenger and, when the controller 20 accepts instruction input of a lane change from the second lane to the first lane, may control travel of the own vehicle 1 in such a way that the own vehicle 1 makes a lane change from the second lane to the first lane. When the controller 20 accepts instruction input of a lane change from the first lane to the second lane, the controller 20 may prohibit lane change by the automated lane change function from the first lane to the second lane.

Because of this configuration, while it is possible to respect an intention of the passenger to make a lane change to the first lane, it is possible to prevent the own vehicle 1 from disturbing traffic flow in the first lane when the own vehicle 1 attempts automated lane change from the first lane to the second lane.

(3) The automated lane change function may include a first automated lane change function to make a lane change to an adjacent lane when vehicle speed of a preceding vehicle of the own vehicle 1 is lower than vehicle speed of the own vehicle 1. The controller 20 may not perform the first automated lane change function to make a lane change from the first lane to the second lane and also may not perform the first automated lane change function to make a lane change from the second lane to the first lane.

The automated lane change function may include a second automated lane change function to make a lane change to an adjacent lane, based on a preset target travel route. The controller 20 may not perform the second automated lane change function to make a lane change from the first lane to the second lane and also may not perform the second automated lane change function to make a lane change from the second lane to the first lane.

Because of this configuration, the automated lane change function that complies with a rule limiting a vehicle that can travel in the first lane can be provided, and recognition by the passenger that the automated lane change to the first lane is restricted is also facilitated.

(4) When the controller 20 determines that a vehicle that can travel in the first lane in which the own vehicle 1 is traveling is limited, the controller 20 may be configured not to perform all automated lane change functions installed in the own vehicle 1.

Because of this configuration, when the automated lane change function that complies with a rule limiting a vehicle that can travel in the first lane is provided, recognition by the passenger that the automated lane change to the first lane is restricted is facilitated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Driving assistance device
11 Sensor
12 Positioning device 13 Map DB
14 In-vehicle device
15 Navigation system
16 Display device
17 Sound output device 18 Input device
19 Vehicle behavior control device
20 Controller
21 Processor
22 Storage device

The invention claimed is:

1. A driving assistance method for performing a lane change of an own vehicle by an automated lane change function, the driving assistance method causing a controller to perform processing comprising:
   determining whether the own vehicle is traveling in a first lane, among the first lane and a second lane that are multiple lanes having a same traveling direction and are adjacent to each other on a road on which the own vehicle is traveling, in a case where vehicles permitted to travel in the first lane are limited by a traffic rule; and
   when determining that the own vehicle is traveling in the first lane, not performing a lane change from the first lane to the second lane by the automated lane change function, which is a control that causes the own vehicle to make a lane change in an automated manner.

2. The driving assistance method according to claim 1, wherein the controller accepts instruction input of a lane change from a passenger,
   when the controller accepts the instruction input of a lane change from the second lane to the first lane, controls travel of the own vehicle in such a way that the own vehicle makes a lane change from the second lane to the first lane, and
   when the controller accepts the instruction input of a lane change from the first lane to the second lane, does not perform a lane change by the automated lane change function from the first lane to the second lane.

3. The driving assistance method according to claim 1, wherein the automated lane change function includes a first automated lane change function to make a lane change to an adjacent lane when vehicle speed of a preceding vehicle of the own vehicle is lower than vehicle speed of the own vehicle, and
   the controller does not perform the first automated lane change function to make a lane change from the first lane to the second lane and also does not perform the first automated lane change function to make a lane change from the second lane to the first lane.

4. The driving assistance method according to claim 1, wherein
   the automated lane change function includes a second automated lane change function to make a lane change to an adjacent lane, based on a preset target travel route, and
   the controller does not perform the second automated lane change function to make a lane change from the first lane to the second lane and also does not perform the second automated lane change function to make a lane change from the second lane to the first lane.

5. The driving assistance method according to claim 1, wherein when the controller determines that a vehicle that travels in the first lane in which the own vehicle is traveling is limited, the controller does not perform all automated lane change functions installed in the own vehicle.

6. A driving assistance device configured to perform a lane change of an own vehicle by an automated lane change function, the driving assistance device causing a controller to perform processing comprising:
   determining whether the own vehicle is traveling in a first lane, among the first lane and a second lane that are multiple lanes having a same traveling direction and are adjacent to each other on a road on which the own vehicle is traveling, in a case where vehicles permitted to travel in the first lane are limited by a traffic rule; and
   when determining that the own vehicle is traveling in the first lane, not performing a lane change from the first lane to the second lane by the automated lane change function, which is a control that causes the own vehicle to make a lane change in an automated manner.

* * * * *